(12) United States Patent
Lupu et al.

(10) Patent No.: US 6,532,324 B2
(45) Date of Patent: Mar. 11, 2003

(54) OPTICAL MULTIPLEXER/DEMULTIPLEXER WITH THREE WAVEGUIDES

(75) Inventors: Anatolic Lupu, Cachan (FR); Alain Carenco, Bourg-la-Reine (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/180,307

(22) Filed: Jun. 27, 2002

(65) Prior Publication Data

US 2002/0159690 A1 Oct. 31, 2002

Related U.S. Application Data

(63) Continuation of application No. 09/584,847, filed on Jun. 1, 2000, now Pat. No. 6,434,296.

(30) Foreign Application Priority Data

Jun. 4, 1999 (FR) .............................................. 99 07058

(51) Int. Cl.[7] .............................. G02B 6/42; H04J 14/08
(52) U.S. Cl. .............................. 385/30; 385/11; 385/24; 385/37; 385/42; 385/14; 385/129; 385/130; 385/132; 359/124; 359/115; 359/130; 359/180
(58) Field of Search ................................ 385/11, 14, 15, 385/24, 29, 30, 42, 37, 39, 45, 129, 130, 131, 132; 389/124, 130, 115; 359/154, 157, 180, 188

(56) References Cited

U.S. PATENT DOCUMENTS

| 4,756,587 A | 7/1988 | Sano et al. ................ 385/42 X |
| 5,064,263 A | 11/1991 | Stein ............................ 385/14 |
| 5,148,507 A | 9/1992 | Tanisawa ...................... 385/41 |
| 5,202,780 A | 4/1993 | Fussganger ................. 359/125 |
| 5,502,783 A | 3/1996 | Wu ............................... 385/42 |
| 5,515,461 A | 5/1996 | Deri et al. .................... 385/30 |
| 5,526,439 A * | 6/1996 | Bergmann .................... 385/24 |
| 5,588,078 A * | 12/1996 | Cheng et al. ................. 385/33 |
| 5,724,461 A * | 3/1998 | Bruno et al. .................. 385/11 |
| 5,818,980 A | 10/1998 | Herrmann ..................... 385/11 |
| 6,072,925 A | 6/2000 | Sakata ........................ 385/24 |
| 6,434,296 B1 * | 8/2002 | Lupu et al. ................... 385/30 |

FOREIGN PATENT DOCUMENTS

| EP | 0518570 A2 | 12/1992 | ............... 385/42 X |
| FR | 9503768 | 10/1996 | ............... 385/11 X |

* cited by examiner

*Primary Examiner*—Brian Healy
(74) *Attorney, Agent, or Firm*—Sughrue Mion, PLLC (57) ABSTRACT

The invention relates to an optical multiplexer/demultiplexer able to combine and/or separate at least two optical signals amongst n propagating at different wavelengths, characterised in that it comprises at least one central waveguide (4) and two lateral waveguides (5, 6), each lateral waveguide (5 and 6) constituting with the central guide (4) a pair of waveguides, each pair being disposed so as to allow a bidirectional evanescent coupling of an associated wavelength between the guides in each pair (4, 5) and (4, 6), the coupling being selective with respect to wavelength and assisted by at least one etched grating (Λ), the said waveguides (4, 5, 6) being designed so that the multiplexer/demultiplexer has a functioning independent of the state of polarisation of the signals. The present invention applies to optical filters and/or direct-access networks for a bidirectional communication in the 1.3±μm window simultaneously with a video distribution at 1.5 μm.

23 Claims, 6 Drawing Sheets

OPTICAL MULTIPLEXER/DEMULTIPLEXER WITH THREE WAVEGUIDES

This is a Continuation of Application Ser. No. 09/584,847, filed Jun. 1, 2000, now U.S. Pat. No. 6,434,296, the disclosure of which is incorporated herein by reference.

BACKGROUND OF THE INVENTION

The present invention is situated in the general field of optoelectronics, and relates to more precisely an optical multiplexer/demultiplexer.

The present invention relates to a multiplexer/demultiplexer having at least three waveguides, each pair of waveguides constituting distinct grating-assisted couplers so as to couple respectively at least two predetermined wavelengths.

The multiplexer/demultiplexer according to the invention can be used in an application for multiplexing and/or demultiplexing at least three wavelengths propagating in three different transmission windows whatever the numerical values of the latter.

Such a multiplexer/demultiplexer can also be used in an optical filtering application, the first coupler filtering a given wavelength and the second coupler, a so-called dummy coupler, serving as a rejection exit for another wavelength, close to the first, so as to refine the spectral response (or transfer function) of the first coupler.

The present invention particularly finds an application in the field of optical fibre distribution networks with direct access at the subscriber. In fact, in the field of optical telecommunications, the concept of FTTH (Fibre to the Home) has become an essential point in development for operators wishing to meet the ever increasing requirements of their customers.

Such distribution networks are already widely used and principally utilise optical fibres in which optical signals propagate in different transmission windows.

The optical signals are received and transmitted, and multiplexed and demultiplexed by optical modules.

Generally, the most usual case is to use two transmission windows, a first 1.3 $\mu$m window for voice communications, and another 1.5 $\mu$m window for video distribution.

Figure 1:
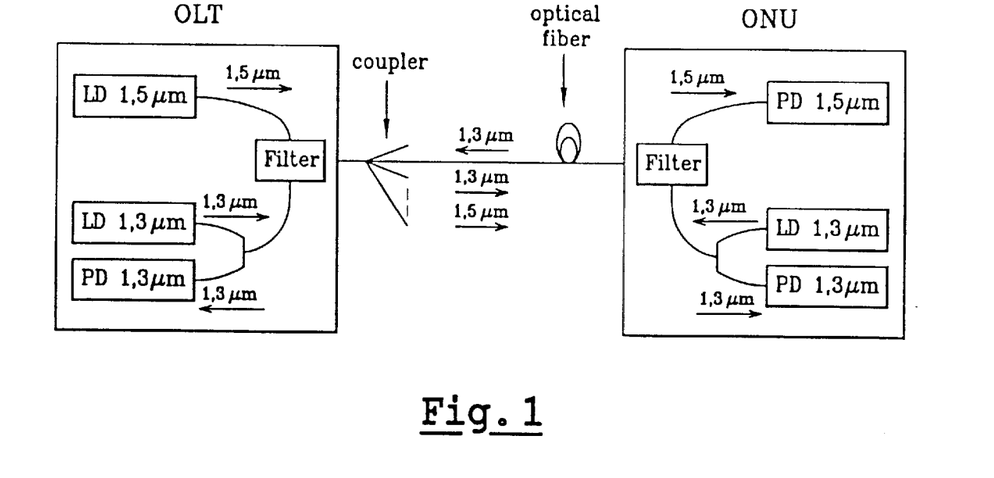
FIG. 1, already described, is a schematic diagram illustrating the principle of optical telecommunication by FTTH.

FIG. 1 is a schematic diagram illustrating the principle of optical telecommunication by FTTH.

An Optical Line Terminal (OLT) provides communication between the different customers through an optical fibre distributor.

Each customer is equipped with an Optical Network Unit (ONU).

The two optical modules, the OLT and the ONU, are advantageously identical through their design. Laser diodes (LD) are used for sending an optical signal at a given wavelength, such as 1.3 $\mu$m or 1.5 $\mu$m, and photodiodes (PD) allow reception of the said optical signals.

The different wavelengths are multiplexed or demultiplexed in two steps. First of all, a filter separates the two wavelengths used and transmitted by optical fibres, and then a coupler separates the inputs and outputs of one and the same transmission window.

In the example illustrated, the 1.3 $\mu$m window is used as an uplink channel and downlink channel for a so-called half-duplex voice communication, that is to say interference can occur between the signals propagating from the OLT to the ONU, and from the ONU to the OLT, the 1.5 $\mu$m window being reserved for video distribution in a downlink channel only.

There exist other embodiments for obtaining a full-duplex voice communication, that is to say one without interference, using for example the 1.3 $\mu$m window for the uplink channel and the 1.5 $\mu$m window for the downlink channel. This embodiment must however abandon video distribution.

The present invention seeks to produce an optical transmitter which allows full-duplex voice communication, that is to say one on two different wavelengths for the uplink and downlink channels, whilst maintaining downlink video distribution.

To this end, the invention proposes to use a first 1.3 $\mu$m transmission window allowing simultaneous bidirectional communication on two different wavelengths, at 1.3− $\mu$m and 1.3+ $\mu$m, and another high transmission rate 1.5 $\mu$m transmission window for video distribution simultaneous with voice communication.

Up to the present time, the 1.3 $\mu$m and 1.5 $\mu$m wavelengths were, in general, separated by a filter on two waveguides. The filtering function could be provided either by hybrid components provided with an adapted dielectric mirror, or by integrated optical components such as a Mach-Zehnder interferometer.

The 1.3 $\mu$m waveguide was then separated into two ports consisting of an input and an output, either by a conventional Y junction or by a 3 dB coupler.

Such a transmission method nevertheless has many drawbacks.

This is because the separation between the input and the output of the 1.3 $\mu$m wave routinely introduces a loss of 3 dB.

In addition, a "ping-pong" effect is introduced into the voice communication channel because the uplink and downlink transmissions use the same 1.3 $\mu$m window.

In addition, transmission on the 1.3 $\mu$m channel is of low throughput, typically a few tens of megabytes per second.

The present invention thus seeks to produce a bidirectional multiplexer/demultiplexer with three wavelengths which allows on the one hand simultaneous bidirectional communication on two different wavelengths and on the other hand distribution on another wavelength.

In the context of an application to direct-access networks, the present invention proposes to use two different wavelengths for a bidirectional communication in the same 1.3 $\mu$m window, for example 1.28 $\mu$m and 1.32 $\mu$m, and to separate them by means of an isotropic filter with a single passband in order not to interfere with the transmission of the optical wave at 1.5 $\mu$m.

Thus another problem which the invention seeks to resolve is to manage to produce an optical filter making it possible to separate signals propagating at wavelengths close to each other (for example 1.28 $\mu$m and 1.32 $\mu$m).

Figure 2:
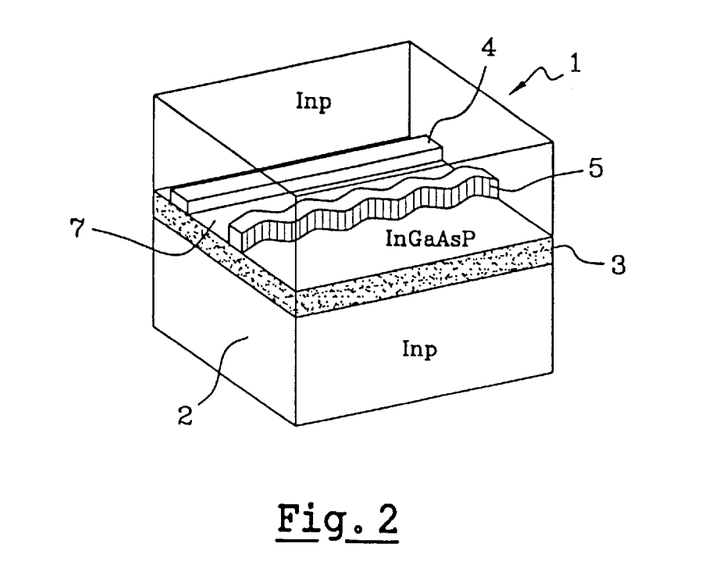
FIG. 2, already described, illustrates schematically a codirectional coupler known in the state of the art.

French patent No. 2 732 478 describes a method of filtering two wavelengths by means of a codirectional coupler. Such a method is illustrated in FIG. 2.

This patent describes a structure with two optical waveguides having a bottom confinement layer 2, a core 3 for guiding the light and two strips 4 and 5 for loading the core and forming the optical guides. Such a structure is suitable for producing a filter, a coupling grating being etched on one of the strips 5.

With such a filter, when the light propagates in a waveguide, all the wavelengths except that of the filter pass through the guide in the direct channel, whilst the chosen wavelength is transferred into the lateral channel in the parallel coupled waveguide.

According to a particularity of the invention described in this patent, the thicknesses of the core and strips are defined so that the two optical guides have the same modal birefringence. The core and strips have in fact a succession of alternating thin layers respectively made from binary material and quaternary material.

Thus a codirectional asymmetric coupler makes it possible to separate a given wavelength $\lambda_0$, fixed by the periodic interference $\Lambda$ etched on one of the strips, the other wavelengths propagating in the other waveguide whatever the state of polarisation of the signals.

SUMMARY OF THE INVENTION

The present invention seeks to produce an optical filter which makes it possible to extract a given wavelength $\lambda_0$, the coupler constituting this filter having a spectral response with a high rejection ratio and a narrow passband. This is because the efficiency of an optical filter is generally limited by the size of the secondary lobes of its transfer function.

Figure 3A:
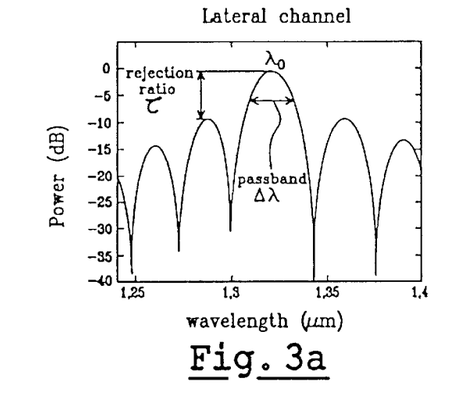
FIGS. 3a and 3b illustrate the spectral response of a conventional coupler respectively on the lateral channel and on the direct channel.
Figure 3B:
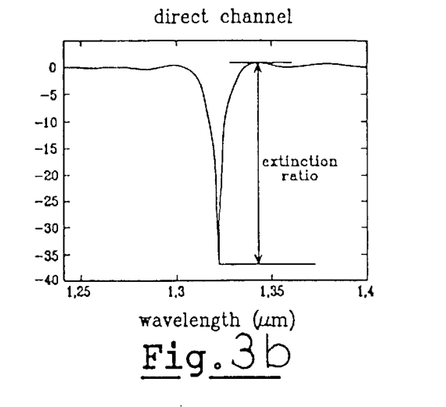

FIGS. 3a and 3b illustrate the spectral responses respectively on the lateral channel and on the direct channel of a conventional optical filter consisting of an optical coupler such as the one described with reference to FIG. 2. It can be seen that the $\lambda_0$ passband $\Delta\lambda$ is relatively broad and that the rejection ratio $\tau$ is low. Such a coupler can therefore not be used for filtering a signal at a given wavelength $\lambda_0$ propagating with other signals at close wavelengths.

Different solutions have been proposed in the prior art for eliminating or reducing the secondary lobes of the spectral response of an optical filter. Such an operation is known as "apodisation" of the filter transfer function.

Figure 4A:
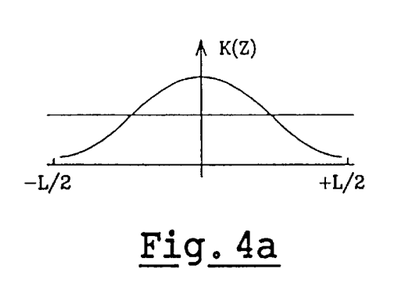
FIG. 4a illustrates a coupling profile.

One particular solution consists in effecting a progressive evanescent coupling. For example, it is possible to achieve a coupling profile like the one illustrated in FIG. 4a by producing curved waveguides (the profile of FIG. 4a is known as a generalised cosine profile). Such a coupling profile k(z) consists in varying the distance separating the waveguides of the coupler (along the Z-axis) over the entire length L of the filter, the coupling being at its maximum at the centre of the filter.

Figure 4B:
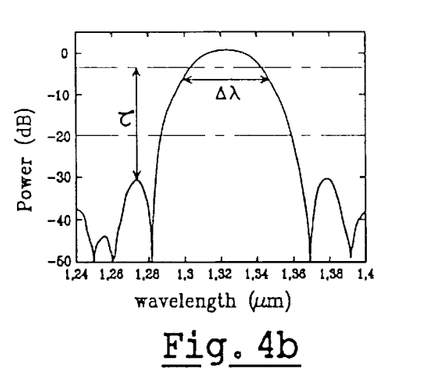

FIG. 4b depicts the transfer function obtained by such a progressive coupler. It will be noted that it has been possible to achieve a rejection ratio $\tau$ of approximately 30 dB. On the other hand, the width of the principal lobe $\Delta\lambda$ has been increased, which is a disadvantage in the case of an optical filter which has to separate wavelengths close to each other.

It is possible to envisage coupling profiles different from the one illustrated in FIG. 4a, but this makes the design of the filter even more complex, or introduces other disadvantages, such as a length of filter multiplied by two for a so-called "box-like" coupling profile for example procuring a square shape.

Figure 5A:
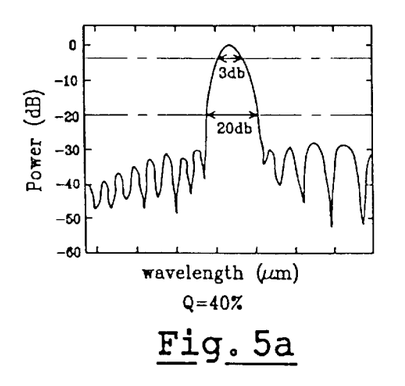
FIG. 5a illustrates an apodised spectral response.
Figure 5B:
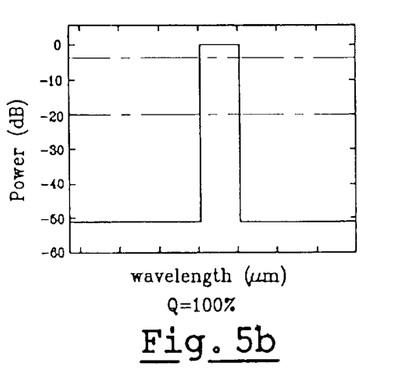
FIG. 5b illustrates an ideal spectral response.

For this purpose a quality coefficient Q is introduced, which represents the ratio of the width of the principal lobe at −3 dB to its width at −20 dB: $Q=\Delta\lambda_{-3dB}/\Delta\lambda_{-20dB}$ FIGS. 5a and 5b illustrate simulated optical filter spectral responses for respective quality coefficients Q of 40% and 100%.

The present invention therefore seeks to produce an optical filter whose spectral response most closely approaches the ideal apodisation function (the function in which the secondary lobes have disappeared and where the principal lobe is narrow).

The first object of the present invention is therefore to achieve a multiplexing and/or demultiplexing function over at least three wavelengths in a single step.

The second objective of the present invention is also to achieve a function of optical filtering of at least one wavelength by means of a first grating-assisted codirectional asymmetric coupler to which there is added at least one other coupler, referred to as a dummy coupler, grating-assisted so as to increase the rejection ratio and reduce the width of the passband of the spectral response of the first coupler of the filter.

In particular, the present invention proposes a structure with three optical waveguides formed by three codirectional strips providing a bidirectional evanescent coupling assisted by at least one grating and dependent on the wavelength.

The object of the present invention is more particularly an optical multiplexer/demultiplexer able to combine and/or separate at least two optical signals amongst n propagating at different wavelengths, characterised in that it comprises at least one central waveguide and two lateral waveguides, each lateral waveguide constituting with the central guide a pair of waveguides, each pair being disposed so as to allow a bidirectional evanescent coupling of an associated wavelength between the guides in each pair, the coupling being selective with respect to wavelength and assisted by at least one etched grating, the said waveguides being designed so that the multiplexer/demultiplexer has a functioning independent of the state of polarisation of the signals.

According to a first embodiment, the central waveguide is etched with a coupling grating, the lateral waveguides being asymmetric so as to couple respectively a first and second wavelengths.

According to a second embodiment, each lateral waveguide is respectively etched with a first and second coupling grating so as to couple respectively a first and second wavelengths.

According to a third embodiment, the coupling gratings of each lateral waveguide are identical, the lateral waveguides being asymmetric so as to couple respectively a first and second wavelengths.

According to an essential characteristic of the present invention, each waveguide has the same modal birefringence.

According to a particularity of the present invention, the two coupled wavelengths propagate in opposite directions, the first being combined with the first lateral guide in the central guide when the second is separate from the wavelengths propagating in the central guide in order to be coupled in the second lateral guide, and vice-versa.

According to a particular embodiment, the two wavelengths coupled respectively by each lateral guide are situated in the same optical transmission window.

According to another characteristic, each lateral guide has a weighted interference in addition to the etching of a coupling grating so that the rejection ratio of the spectral response of each coupler of the multiplexer/demultiplexer is greater than or equal to 10 dB.

Advantageously, the weighted interference consists of a curvature of the lateral guides, with respect to the straight central guide.

Preferentially, the distance between the central guide and each lateral guide varies between 2 and 5 μm.

According to a particular embodiment of the invention, the optical multiplexer/demultiplexer comprises a central waveguide and a plurality of pairs of lateral waveguides, each pair of lateral waveguides being able to successively couple two wavelengths ($\lambda_1$, $\lambda_2$).

Another object of the invention is an optical filter comprising at least one multiplexer/demultiplexer according to the invention.

According to one characteristic of this optical filter, a pair of waveguides constitutes a first coupler able to couple the wavelength of the signal to be filtered, the other pair or pairs of waveguides constituting dummy couplers able to couple one or more rejection wave or waves, close to the filtered wavelength, so as to increase the rejection ratio and to decrease the width of the passband of the spectral response of the first coupler.

The invention also relates to an optical transmitter comprising a plurality of photodiodes and a plurality of photodetectors, and also comprising a multiplexer/demultiplexer according to the invention.

The invention particularly applies to direct access networks comprising an Optical Line Terminal and a plurality of Optical Network Units, optical fibres connecting the latter to the former, characterised in that each terminal comprises an optical transmitter according to the invention.

According to a particular embodiment of the invention, at least three optical signals are propagated between the OLT and each ONU, a first 1.5 $\mu$m optical signal intended for video distribution, and two other optical signals at 1.3– $\mu$m and 1.3+ $\mu$m intended for a bidirectional voice communication.

Advantageously, the optical signals at 1.3– $\mu$m and 1.3+ $\mu$m are respectively coupled in the lateral waveguides, the 1.5 $\mu$m optical signal propagating in the central waveguide.

Preferentially, the optical signals intended for bidirectional communication are fixed at 1.28 $\mu$m and 1.32 $\mu$m.

The optical module according to the invention has the advantage of being simple to produce, and in particular of using known manufacturing techniques.

Advantageously, the same multiplexer/demultiplexer according to the invention can be used in the optical line terminal OLT, and in the optical network unit ONU.

This is because the optical multiplexer/demultiplexer according to the invention can easily be integrated into a monolithic component with laser diodes and photodetectors. The same component can be placed in the OLT or the ONU, only the relative arrangement of the different elements being different.

The use of two wavelengths for voice transmission at 1.3 $\mu$m improves the transmission rate by a factor of ten.

It should also be noted that such a coupling concept can easily be extended to other transmission windows.

BRIEF DESCRIPTION OF THE DRAWINGS

Other particularities and advantages of the invention will emerge from a reading of the description given for purposes of illustration and non-limitatively and made with reference to the accompanying figures, which depict:

FIG. 4b illustrates the spectral response of a coupler with the profile of FIG. 4a;

DETAILED DESCRIPTION OF THE INVENTION

In the description which follows, reference is made firstly to the use of the multiplexer/demultiplexer according to the invention for a multiplexing and/or demultiplexing function, in particular in the context of optical telecommunication by FTTH.

Advantageously, the same optical multiplexers/demultiplexers are used for producing the transmitter of the Optical Line Terminal OLT and those of the Optical Network Units ONU of the customers.

Figure 6:
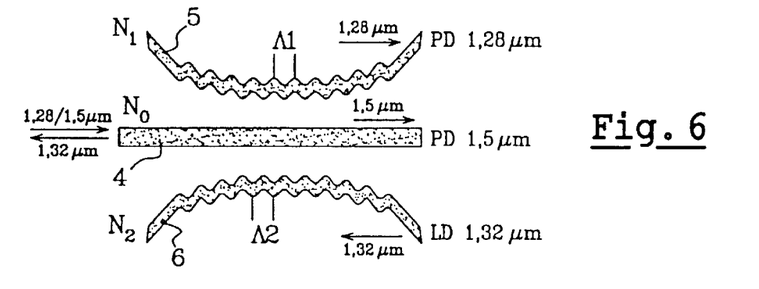
FIG. 6 is a diagram of a first embodiment of the multiplexer/demultiplexer according to the invention seen from above.

FIG. 6 illustrates a first embodiment of the multiplexer/demultiplexer according to the invention in which the central waveguide 4 is not etched, whilst the lateral waveguides are respectively etched with coupling gratings $\Lambda_1$ and $\Lambda_2$ in order to couple respectively two predetermined wavelengths $\lambda_1$ and $\lambda_2$.

In the examples illustrated, these wavelengths $\lambda_1$ and $\lambda_2$ have been fixed at 1.28 $\mu$m and 1.32 $\mu$m, which corresponds to the application of a bidirectional voice communication in the 1.3 $\mu$m optical transmission window.

According to the example chosen, the OLT sends downlink optical signals at 1.28 $\mu$m and 1.5 $\mu$m to the ONUs of the customers. The 1.28 $\mu$m optical signal, emitted by a laser diode of the OLT, is coupled by the grating $\Lambda_1$ of the lateral waveguide 5 in the central waveguide 4.

The OLT also receives an uplink 1.32 $\mu$m optical signal from the ONUs of the customers. This signal is coupled by the grating $\Lambda_2$ of the central waveguide 4 to the lateral waveguide 6 in order to be directed to the 1.32 $\mu$m photodetector.

In addition, each ONU receives downlink optical signals at 1.28 $\mu$m and 1.5 $\mu$m through the central waveguide. The 1.28 $\mu$m signal is coupled by the grating $\Lambda_1$ of the central waveguide 4 to the lateral waveguide 5 in order to be directed to the 1.28 $\mu$m photodetector, whilst the 1.5 $\mu$m signal is not affected by the grating and continues its propagation in the central waveguide in order to be interpreted by the 1.5 μm photodetector.

Likewise, the 1.32 μm uplink optical signal, emitted by the laser diode of the ONU, is coupled by the grating $\Lambda_2$ of the lateral waveguide 6 in the central waveguide 4.

The dependence of the lateral waveguides on a given wavelength is obtained by a periodic interference linked by a precise relationship to the etched grating.

Thus, with $\lambda_1$, $\lambda_2$, the wavelengths which it is wished to couple (1.28 μm and 1.32 μm), $\Lambda_1$, $\Lambda_2$, the pitch of the etched grating respectively for 1.28 μm and for 1.32 μm, $N_0$, the effective refractive index of the central guide, $N_1$, $N_2$, the effective refractive indices of each lateral waveguide, the following equations are obtained:

$$\lambda_1 = \Lambda_1(N_1 - N_0)$$

$$\lambda_2 = \Lambda_2(N_2 - N_0) \quad (1)$$

The independence of each coupler of the polarisation of the wave intended to be filtered is obtained when:

$$\lambda_1^{TM} = \lambda_1^{TE}$$

$$\lambda_2^{TM} = \lambda_2^{TE} \quad (2)$$

The independence of the multiplexer/demultiplexer according to the invention of the polarisation of the light is therefore given by the double equation:

$$N_1^{TE} - N_1^{TM} = N_2^{TE} - N_2^{TM} = N_0^{TE} - N_0^{TM} \quad (3)$$

This equation requires that the speeds of propagation of the electrical and magnetic transverse modes of the light waves in each of the guides of the multiplexer/demultiplexer be equal. This condition is important since the optical fibres which provide the connection between the OLT and the ONUs do not preserve the polarisation of the light.

According to one particularity of the invention, the functioning of the multiplexer/demultiplexer is independent of the state of polarisation of the signals transmitted and/or separated. Producing waveguides with the same modal birefringence is known and has already been mentioned with reference to FIG. 2.

According to a variant embodiment, the independence of the polarisation of the signals can be obtained by a zero birefringence with a particular geometry of the waveguides (square or circular guides) or by stresses in the structure of the semiconductor materials constituting the waveguides (mismatching of meshes for example).

It will also be remarked that the three waveguides 4, 5 and 6 are not parallel. This is because, if such were the case, the rejection ratio of the couplers would be too low, approximately 9 dB, and the wavelengths of the same 1.3 μm window would risk being coupled in the same channel.

In order to mitigate this risk, the strips of the waveguides 5 and 6 have a curvature which causes a weighted interference which improves the rejection ratio.

Thus the mean distance between the lateral guides and the central guide varies, for example, between 2 μm and 5 μm. This additional weighted interference makes it possible to obtain a rejection ratio greater than or equal to 10 dB.

Figure 7:
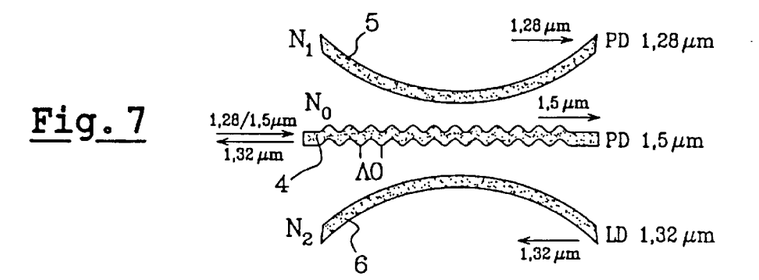
FIG. 7 is a diagram of a second embodiment of the multiplexer/demultiplexer according to the invention seen from above.

FIG. 7 illustrates a second embodiment of the multiplexer/demultiplexer according to the invention. This embodiment constitutes the double of the first embodiment previously described.

According to this second embodiment, the central waveguide is etched with a coupling grating $\Lambda_0$, whilst the lateral waveguides 5 and 6 are not etched.

Nevertheless, in order to ensure the coupling of two different optical signals, the lateral guides are asymmetric, that is to say they have effective indices $N_1$ and $N_2$ which are not close.

This asymmetry will be explained more fully with reference to FIG. 9.

The pitch of the grating $\Lambda_0$ of the central waveguide 4 and the indices $N_1$ and $N_2$ of the lateral waveguides 5 and 6 are fixed to allow the respective coupling of the two predetermined wavelengths $\lambda_1$ and $\lambda_2$.

This thus gives the equations:

$$\lambda_1 = \Lambda_0(N_0 - N_1)$$

$$\lambda_2 = \Lambda_0(N_0 - N_2)$$

with the condition of modal birefringence still complied with as defined previously.

A third embodiment of the multiplexer/demultiplexer according to the invention, not illustrated, consists of a variant of the first embodiment.

According to this embodiment, the pitches of the gratings $\Lambda_1$ and $\Lambda_2$ of the lateral waveguides 5 and 6 are identical.

The coupling of the two different wavelengths $\lambda_1$ and $\lambda_2$ is then obtained by means of an asymmetry of the lateral guides 5 and 6.

This asymmetry is obtained in the same way as in the second embodiment previously described.

This thus gives:

$$\Lambda_1 = \Lambda_2 = \Lambda$$

and $$\lambda_1 = \Lambda(N_1 - N_0)$$

$$\lambda_2 = \Lambda(N_2 - N_0)$$

with the condition of modal birefringence still complied with.

Figure 8:
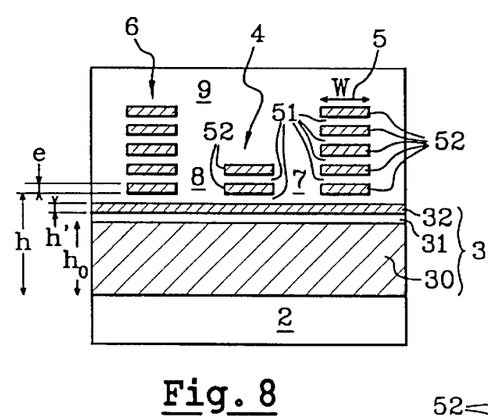
FIG. 8 is a diagram in transverse section of FIG. 6.
Figure 9:
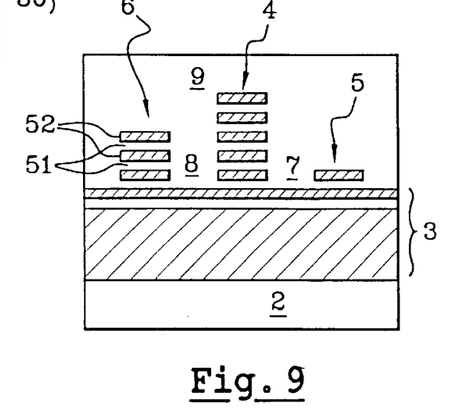
FIG. 9 is a diagram in transverse section of FIG. 7.

The description which follows, with reference to FIGS. 8 and 9, repeats a technique similar to that of the previously mentioned patent No 2 732 478, but applied to an optical multiplexer/demultiplexer with three waveguides.

FIGS. 8 and 9 schematically illustrate a view in section of the multiplexer/demultiplexer according to the first and second embodiments of the invention. The optical module has a core and three etched strips 4, 5 and 6 defining three optical guides.

The description which follows refers to a particular embodiment of the codirectional couplers of the multiplexer/demultiplexer according to the invention in which the waveguides are produced on a III-V semiconductor.

This variant corresponds to a preferential embodiment since it allows an easy monolithic integration with the other components of a transmitter, such as photodiodes and photodetectors for example.

It is nevertheless possible to envisage producing these waveguides on silicon, on a dielectric, on lithium niobate or on polymers for example, and then to effect an integration of the other components, lasers and photodiodes, by hybridisation.

According to the preferential embodiment on III-V material, the structure with three optical guides includes a bottom confinement layer 2 and a core 3 for guiding the light, surmounted by three loading strips 4, 5 and 6 intended to laterally confine the light in the core 3 and form three optical guides which are parallel, monomode, plane and loaded. The effective refractive index of the core 3 is greater than that of the bottom confinement layer 2 and that of the loading strips 4, 5 and 6. The latter and the core 3 are covered with a top confinement layer 9, with a refractive index less than the effective index of the core and less than that of the loading strips. The strips 4, 5 and 6 extend longitudinally and are separated by grooves 7 and 8.

The core 3 and loading strips 4, 5 and 6 are produced by successive deposition of alternating thin layers, the thicknesses of the core 3 and loading strips 4, 5 and 6 satisfying the aforementioned equation (3) representing the equality of the modal birefringencies of the optical guides.

In a preferred example embodiment of the invention, the various layers are deposited by vapour phase epitaxy (VPE). The bottom confinement layer 2 consists of InP binary material and is produced on a flat substrate. Then a solid layer 30 of InGaAsP quaternary material is deposited, with a thickness $h_0$, and then a succession of alternating thin layers 31, 32 respectively of InP binary material and an InGaAsP quaternary material, over a total thickness h'. Each thin layer 31 or 32 has a thickness e less than or equal to 200 Å, which makes it possible to control the total thickness $h=h_0+h'$ of the core layer 3 with a precision of around ±100 Å. The choice of the total thickness h depends on the required spectral response for the filter.

After production of the core 3, a succession of alternating thin layers 51, 52 are deposited by epitaxy, respectively InP binary material and InGaAsP quaternary material. Each thin layer 51, 52 has a thickness e less than or equal to 200 Å. A mask is then produced and the loading strips 4, 5 and 6 are etched by dry attack, in a manner known per se.

In this way there is obtained an optical multiplexer/demultiplexer with three strips 4, 5 and 6 separated respectively by grooves 7 and 8.

The optical guides associated with the strips and load 4, 5 and 6 have different effective indices, respectively equal to $N_0$, $N_1$ and $N_2$, which are related directly to the respective heights of the strips 4, 5 and 6.

According to the first embodiment, illustrated in FIG. 8, the lateral strips 5 and 6 are etched so as to be symmetrical, that is to say they represent the same number of alternating thin layers 51 and 52, whilst the central strip 4 is etched with a lesser height.

The loading strips 5 and 6 are then etched laterally in order each to form a coupling grating with a period $\Lambda_1$ and $\Lambda_2$ in the longitudinal direction. They have a rectangular transverse section.

The coupling gratings $\Lambda_1$ and $\Lambda_2$ are etched respectively on the strips 5 and 6 by lithogravure or any other known means. Preferentially, the pitch of each grating is between 100 and 150 µm.

According to a particular embodiment, cited by way of example, the widths of the strips 4, 5 and 6 vary from 1 to 2 µm, with preferential values of 1.5 µm. The height of the central strip can for example be fixed at 0.08 µm, which corresponds to a succession of four epitaxial layers alternately made from binary and quaternary materials with a thickness of 0.02 µm, the height of the lateral strips advantageously being fixed at 0.24 µm, that is to say twelve successive layers.

The width of the grooves 7 and 8 for its part varies from 2 µm to 5 µm, the lateral strips being etched in a slightly curved manner, as described with reference to FIG. 3.

In the second embodiment, illustrated in FIG. 9, the three strips 4, 5 and 6 are etched asymmetrically, that is to say they each have a different number of alternating thin layers 51 and 52, and consequently different heights.

The central strip 4 is then etched laterally in order to form a coupling grating with a period $\Lambda_0$ in the longitudinal direction. This etching is obtained in accordance with conventional techniques, lithogravure for example.

The asymmetry between the lateral strips 5 and 6 is essential to allow coupling of two different wavelengths $\lambda_1$ and $\lambda_2$ in each of the lateral guides 5 and 6.

This is because this asymmetry causes a high disparity between $N_1$ and $N_2$, which allows coupling of the predetermined wavelengths $\lambda_1$ and $\lambda_2$ in the lateral guides 5 and 6 by means of a single grating $\Lambda_0$ etched on the central strip 4.

Figure 10A:
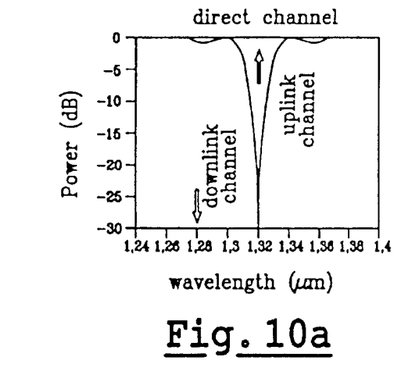
FIGS. 10a and 10b are spectral responses, respectively of the direct channel and of a lateral channel of a coupler according to the invention.
Figure 10B:
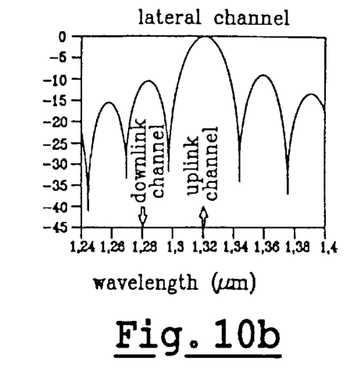
Figure 11:
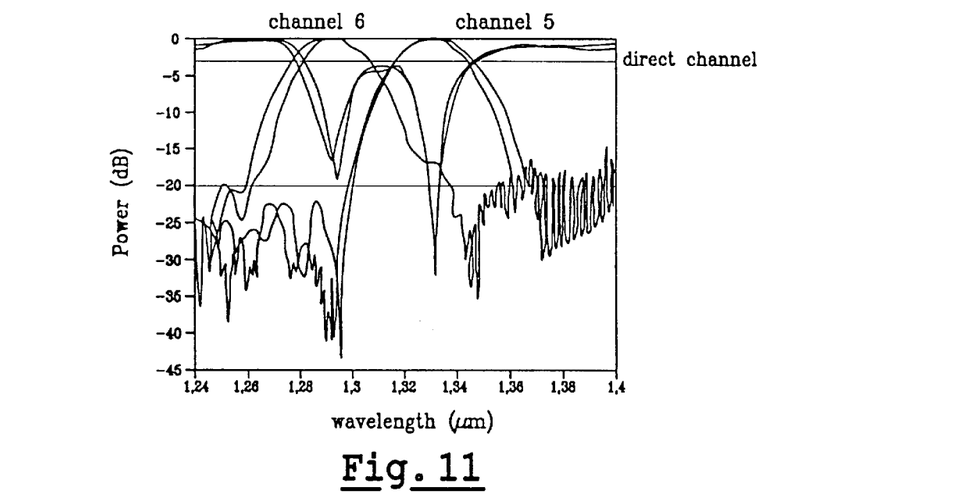
FIG. 11 is an experimental spectral response of the couplers of the multiplexer/demultiplexer according to the present invention.

FIGS. 10a, 10b and 11 illustrate the spectral responses obtained by means of codirectional couplers.

FIGS. 10a and 10b illustrate spectral responses simulated for an asymmetric etched filter with two waveguides.

All the wavelengths except the one which is to be filtered pass through the filter in the direct channel, whilst the chosen wavelength is coupled in the lateral waveguide and passes through the filter in the lateral channel.

The example of FIGS. 10a and 10b is given for a 1.32 µm etched filter.

FIG. 11 is a spectral response obtained experimentally by means of the double coupler of the multiplexer/demultiplexer according to the invention.

Such an experimental response shows on the one hand that the modal birefringence condition is fulfilled, and on the other hand that the rejection ratio is sufficient to allow a good separation of the wavelengths in the same optical transmission window.

Figure 12:
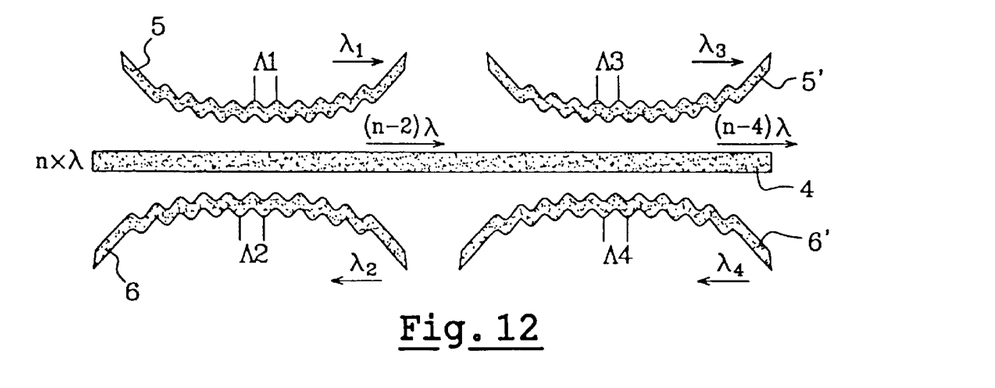
FIG. 12 is a diagram of a third embodiment of the multiplexer/demultiplexer according to the invention seen from above.

FIG. 12 illustrates a particular embodiment of the invention in which a plurality of multiplexer/demultiplexers according to the invention are placed in cascade so as to combine and/or separate 2×m different wavelengths amongst n, m being the number of multiplexers/demultiplexers placed in series.

According to this embodiment, the multiplexer/demultiplexer comprises a single central guide 4 and a plurality of pairs of lateral waveguides 5, 5' and 6, 6', each pair being able to couple two different wavelengths $\lambda_1$ and $\lambda_2$.

In the following description, reference is now made to the use of the multiplexer/demultiplexer according to the invention for an optical filtering function.

The structure of the waveguides remains the same as in the application to multiplexing and/or demultiplexing previously described. The respective functions of the grating-assisted couplers are simply different, although similar.

The optical filter according to the invention is based on a grating-assisted coupler, such as the one described in French patent FR 2 732 478 with reference to FIG. 2.

The invention proposes to add at least one other coupler, referred to as a dummy coupler, consisting of at least a third waveguide, whose function is to extract a non-required portion of the spectral response of the first coupler. Adding such a dummy waveguide in no way interferes with the functioning of the first coupler. In this way, it becomes possible to "cut" the passband of the first coupler, either on the side of the lowest wavelengths, or on the side of the highest wavelengths, or on both sides by adding two dummy guides. The dummy guide or guides are in fact couplers whose passband is very close to the secondary lobe or lobes of the transfer function of the first coupler. The purpose of the dummy coupler or couplers is to extract the optical power coupled in the first coupler of the transmission window corresponding to the secondary lobes of the transfer function of the first coupler.

Figure 13:
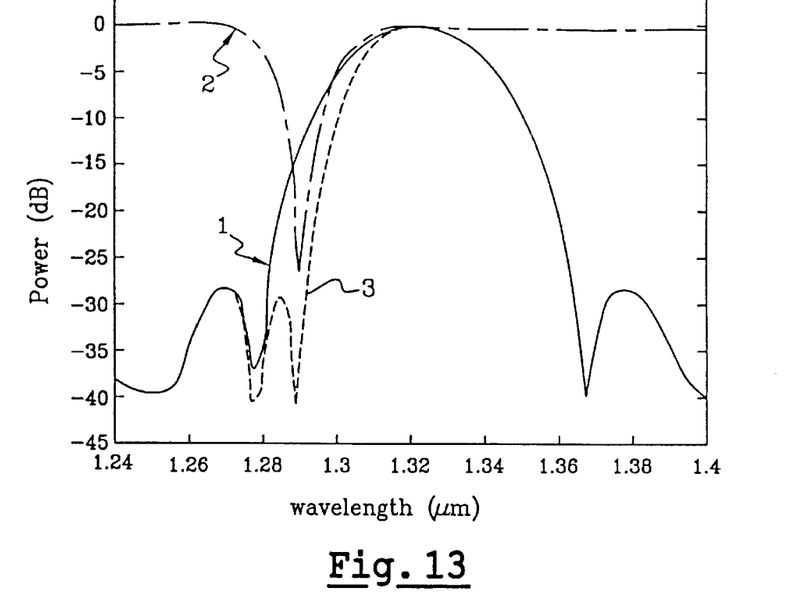
FIG. 13 illustrates a spectral response of the optical filter according to the invention.

This objective is illustrated in FIG. 13 by the graph of the spectral response of the optical filter according to the invention. The first curve (solid line) illustrates the spectral response on the lateral channel of a first conventional coupler set at 1.32 μm, the second curve (long broken lines) illustrates the spectral response on the direct channel of the added dummy coupler, and the third curve (short broken lines) represents the spectral response on the lateral channel of the first coupler resulting from the addition of the dummy coupler.

The spectral response obtained (curve 3) has a rejection ratio of 30 to 40 dB and a passband width which is smaller compared with that of the coupler alone (curve 1).

As a first approximation, it can be considered that there is cut from the spectral response of the lateral channel of the first coupler a portion of spectrum equivalent to the spectral response of the direct channel of the dummy coupler.

In such an application to an optical filter, the multiplexer/demultiplexer according to the invention keeps the same structure as the one described with reference to FIGS. 6 to 9.

Figure 14:
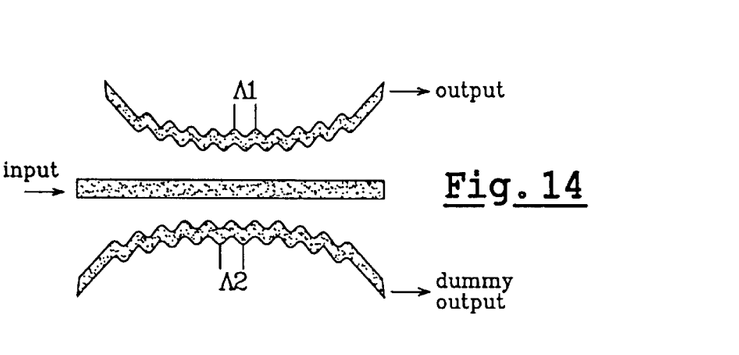
FIG. 14 is a diagram of a first embodiment of the optical filter according to the invention.
Figure 15:
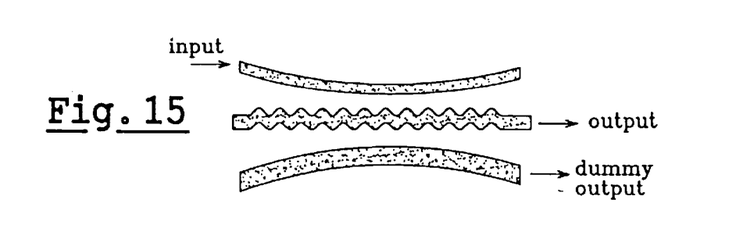
FIG. 15 is a diagram of a second embodiment of the optical filter according to the invention.
Figure 16:
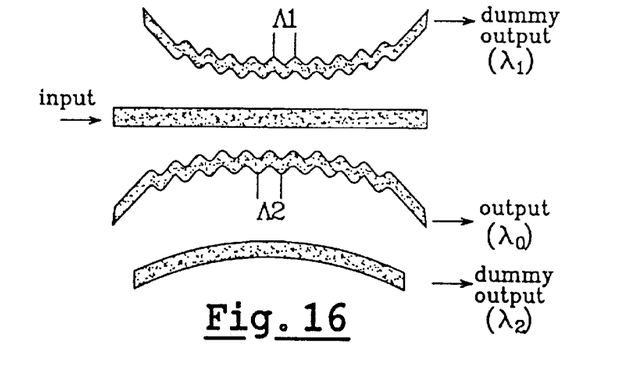
FIG. 16 is a diagram of a third embodiment of the optical filter according to the invention.

According to the applications, the dummy coupler can be directly coupled to the input guide (FIG. 14) or to the output guide of the first coupler (FIG. 15). In order to apodise the spectral response of the two sides of the spectrum, two dummy couplers can be used, one coupled to the input guide and the other coupled to the output guide of the first coupler (FIG. 16).

More complex assemblies using several dummy couplers placed in series and/or in parallel and constituting optical filters can be envisaged.

Figure 17:
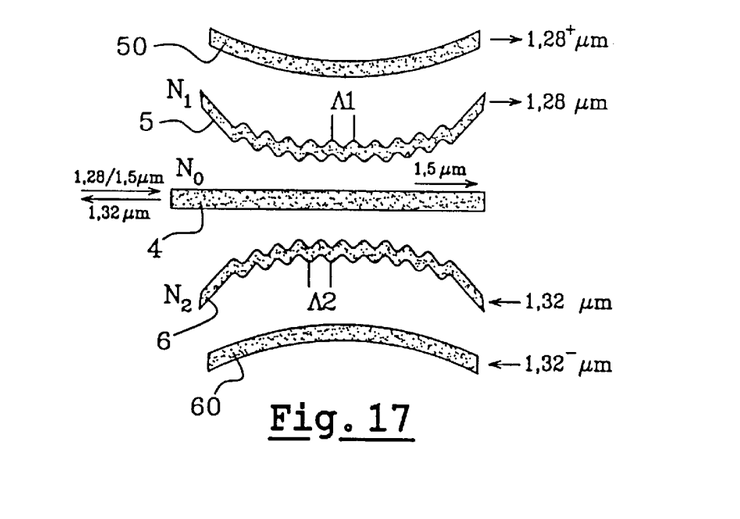
FIG. 17 is a diagram of a fourth embodiment of the multiplexer/demultiplexer according to the invention seen from above.
Figure 18:
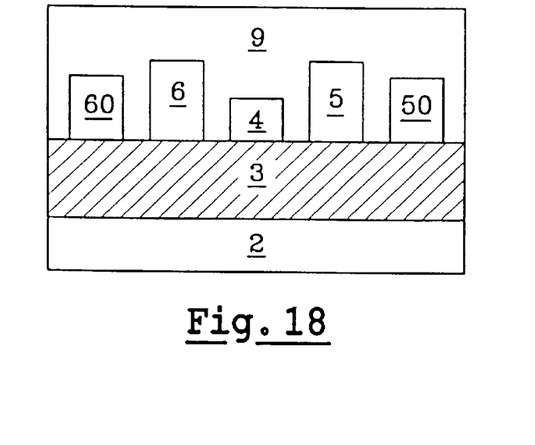
FIG. 18 is a diagram in transverse section of FIG. 17.

In a particular embodiment of the multiplexer/demultiplexer according to the invention, the functions of multiplexing/demultiplexing and optical filtering can be combined, as illustrated in FIGS. 17 and 18.

Three waveguides 4, 5, 6 make it possible to separate and/or combine two lengths $\lambda_1$ and $\lambda_2$ for a multiplexing/demultiplexing with respect to wavelength. Advantageously, two other dummy lateral waveguides 50 and 60 can respectively be placed outside the waveguides 5 and 6 in order to filter the wavelengths $\lambda_1$ and $\lambda_2$ extracted by the multiplexer/demultiplexer so as to apodise the spectral responses by extracting the signals not required.

For example, the dummy guide 50 is set at 1, 28⁺ μm (1, 32 μm) in order to remove the signal portions at this wavelength which would have been coupled in the waveguide 5 set at 1, 28 μm in order to increase the rejection ratio of the guide 5, and conversely the dummy guide 60 is set at 1, 32⁻ μm (1, 28 μm).

What is claimed is:

1. An optical filter, comprising at least one multiplexer/demultiplexer able to combine and/or separate at least two optical signals amongst n optical signals propagating at different wavelengths, wherein said multiplexer comprises at least one central waveguide and two lateral waveguides, each lateral waveguide constituting with the central guide a pair of waveguides, each pair being disposed so as to allow a bidirectional evanescent coupling of an associated wavelength between the guides in each pair and, the coupling being independent with respect to polarization of the signals, and being selective with respect to wavelength and assisted by at least one etched grating, whereby the multiplexer/demultiplexer has a functioning independent of the state of polarization of the signals.

2. An optical filter according to claim 1, wherein one of said pairs of waveguides constitutes a first coupler able to couple the wavelength of the signal to be filtered, the other pair or pairs of waveguides constituting one or more dummy couplers able to couple one or more rejection wavelengths, close to the filtered wavelength, so as to increase a rejection ratio and reduce the width of the passband of the spectral response of the first coupler.

3. An optical filter according to claim 1, wherein the central waveguide is etched with a coupling grating, the lateral waveguides being asymmetric so as to couple respective first and second wavelengths.

4. An optical filter according to claim 1, wherein each lateral waveguide is respectively etched with a first and second coupling grating so as to couple respective first and second wavelengths.

5. An optical filter according to claim 4, wherein the coupling gratings are identical, the lateral waveguides being asymmetric so as to couple respective first and second wavelengths.

6. An optical filter according to claim 1, wherein each waveguide has the same modal birefringence.

7. An optical filter according to claim 1, wherein the two wavelengths coupled respectively by each lateral guide (5, 6) are situated in the same optical transmission window.

8. An optical filter according to claim 1, wherein each lateral guide (5, 6) has a weighted interference in addition to the etching of a coupling grating ($\Lambda_1$, $\Lambda_2$) so that the rejection ratio of the spectral response of each coupler of the multiplexer/demultiplexer is greater than or equal to 10 dB.

9. An optical filter according to claim 8, wherein the weighted interference consists of a curvature of the lateral guides (5, 6) with respect to the straight central guide (4).

10. An optical filter according to claim 9, wherein the distance between the central guide (4) and each lateral guide (5, 6) varies between 2 and 5 μm.

11. An optical filter according to claim 1, wherein the two coupled wavelengths ($\lambda_1$, $\lambda_2$) propagate in opposite directions, the first coupled wavelength ($\lambda_1$) being combined with the first lateral guide (5) in the central guide (4) when the second coupled wavelength ($\lambda_2$) is separated from the wavelengths propagating in the central guide (4) in order to be coupled in the second lateral guide (6), and vice-versa.

12. An optical filter according to claim 1, wherein said multiplexer/demultiplexer comprises a central waveguide (4) and a plurality of pairs of lateral waveguides (5, 6), each pair of lateral waveguides being able to couple successively two wavelengths ($\lambda_1$, $\lambda_2$).

13. An optical transmitter comprising a plurality of light sources and photodetectors, said optical transmitter further comprising an optical multiplexer/demultiplexer able to combine and/or separate at least two optical signals amongst n optical signals propagating at different wavelengths, said optical multiplexer/demultiplexer comprising at least one central waveguide (4) and two lateral waveguides (5, 6), each lateral waveguide (5 and 6) constituting with the central guide (4) a pair of waveguides, each pair being disposed so as to allow a bidirectional evanescent coupling of an associated wavelength between the guides in each pair (4, 5) and (4, 6), the coupling being independent with respect to polarization of the signals, and being selective with respect to wavelength and assisted by at least one etched grating ($\Lambda$), whereby the multiplexer/demultiplexer has a functioning independent of the state of polarization of the signals.

14. An optical transmitter according to claim 13, wherein the central waveguide (4) is etched with a coupling grating ($\Lambda_0$), the lateral waveguides (5, 6) being asymmetric so as to couple respective first and second wavelengths ($\lambda_1$, $\lambda_2$).

15. An optical transmitter according to claim 13, wherein each lateral waveguide (5, 6) is respectively etched with a first and second coupling grating ($\Lambda_1$, $\Lambda_2$) so as to couple respective first and second wavelengths ($\lambda_1$, $\lambda_2$).

16. An optical transmitter according to claim 15, wherein the coupling gratings ($\Lambda_1$, $\Lambda_2$) are identical, the lateral waveguides being asymmetric so as to couple respective first and second wavelengths ($\lambda_1$, $\lambda_2$).

17. An optical transmitter according to claim 13, wherein each waveguide (4, 5, 6) has the same modal birefringence.

18. An optical transmitter according to claim 13, wherein the two wavelengths ($\lambda_1$, $\lambda_2$) coupled respectively by each lateral guide (5, 6) are situated in the same optical transmission window.

19. An optical transmitter according to claim 13, wherein each lateral guide (5, 6) has a weighted interference in addition to the etching of a coupling grating ($\Lambda_1$, $\Lambda_2$) so that the rejection ratio of the spectral response of each coupler of the multiplexer/demultiplexer is greater than or equal to 10 dB.

20. An optical transmitter according to claim 19, wherein the weighted interference consists of a curvature of the lateral guides (5, 6) with respect to the straight central guide (4).

21. An optical transmitter according to claim 20, wherein the distance between the central guide (4) and each lateral guide (5, 6) varies between 2 and 5 µm.

22. An optical transmitter according to claim 13, wherein the two coupled wavelengths ($\lambda_1$, $\lambda_2$) propagate in opposite directions, the first coupled wavelength ($\lambda_1$) being combined with the first lateral guide (5) in the central guide (4) when the second coupled wavelength ($\lambda_2$) is separated from the wavelengths propagating in the central guide (4) in order to be coupled in the second lateral guide (6), and vice-versa.

23. An optical transmitter according to claim 13, wherein the multiplexer/demultiplexer comprises a central waveguide (4) and a plurality of pairs of lateral waveguides (5, 6), each pair of lateral waveguides being able to couple successively two wavelengths ($\lambda_1$, $\lambda_2$).

\* \* \* \* \*